United States Patent [19]
Dodd

[11] 3,783,522
[45] Jan. 8, 1974

[54] METHOD AND APPARATUS FOR SHAFT ALIGNMENT

[76] Inventor: Vaal Ray Dodd, Box 273, Rt. 2, Grand Bay, Ala. 36541

[22] Filed: Mar. 9, 1973

[21] Appl. No.: 339,907

Related U.S. Application Data

[63] Continuation-in-part of Ser. No. 240,930, April 4, 1972, abandoned.

[52] U.S. Cl. .................. 33/181 R, 33/180 R, 73/462
[51] Int. Cl. ............................................ G01b 7/31
[58] Field of Search ..................... 33/180 R, 181 R, 33/84, 181 A, 174; 73/66, 363, 460, 461, 462; 74/813

[56] References Cited
UNITED STATES PATENTS

| | | | |
|---|---|---|---|
| 3,525,158 | 8/1970 | Torlay .............................. | 33/84 X |
| 2,638,676 | 5/1953 | Callahan ............................. | 33/84 |
| 3,548,209 | 12/1970 | Smith .......................... | 33/180 R X |
| 2,815,582 | 12/1957 | Karstens........................... | 33/180 R |
| 3,348,057 | 10/1967 | Burroughs..................... | 33/181 A X |
| 2,656,607 | 10/1953 | Harding ........................ | 33/180 R X |
| 2,956,344 | 10/1960 | Rautsch ............................. | 33/174 |
| 3,307,164 | 2/1967 | Zimmer ............................ | 340/195 |
| 2,516,854 | 8/1950 | Christian.......................... | 33/180 R |
| 2,833,051 | 5/1958 | Cunningham .................... | 33/180 R |

Primary Examiner—John W. Huckert
Assistant Examiner—Milton Gerstein
Attorney—Burns, Boane, Swecker & Mathis

[57] ABSTRACT

Method and apparatus for obtaining misalignment data of rotating apparatus under operating conditions and for offset aligning shafts of rotating apparatus at ambient conditions to provide substantially coaxial alignment when operating under equilibrium conditions. Remotely operable proximity sensing means and reference means are supported by elongate members, bearing a predetermined relationship to shaft axes, and cooperate to continuously detect at least functions of relative horizontal and relative vertical displacement of the elongate members. The remotely operable proximity sensing means further cooperates with display means to provide a continuous display of the proximity of the remotely operable proximity sensing means to the reference means and provide a display indicative of the functions of relative horizontal and vertical displacement of the elongate members occurring as the rotating apparatus changes from atrest ambient condition to a thermal equilibrium operating condition. This display is provided at a location remote from the shafts of the rotating apparatus and remote from the elongate members.

17 Claims, 9 Drawing Figures

OFFSET ALIGNMENT AT AMBIENT CONDITIONS
NECESSARY FOR NEAR COLLINEAR ALIGNMENT
AT EQUILIBRIUM OPERATING CONDITIONS.

3,783,522

METHOD AND APPARATUS FOR SHAFT ALIGNMENT

CROSS REFERENCE TO RELATED APPLICATIONS

This application is a continuation-in-part of my application Ser. No. 240,930, filed Apr. 4, 1972, now abandoned.

BACKGROUND OF THE INVENTION

This invention relates to aligning shafts of rotating equipment so that the shafts will be substantially coaxially aligned under thermal equilibrium operating conditions and, more particularly, this invention provides a method and apparatus for obtaining misalignment data of coupled rotating shafts under operating conditions and of using such data to realign the shafts at ambient conditions so that substantially coaxial alignment will occur under operating conditions.

In general, when two rotatable shafts are being coupled together substantially perfect axial alignment of the shafts is the most desirable condition. There are many methods available for achieving coaxial alignment of ambient temperature static shafts of rotating equipment. A more difficult problem, however, is achieving coaxial alignment under operating equilibrium conditions since thermal effects of operation serve to misalign otherwise aligned shafts. Thus, the accuracy with which ambient condition misalignment of shafts can be measured has increased significantly in recent years. Unfortunately, however, knowing the exact ambient position of shafts offers little help toward the primary goal of attaining precisely-aligned shafts at operating equilibrium conditions.

A significant portion of shaft misalignment occurs as a result of the thermal growth of the apparatus in proximity to the shaft. Turbomachinery, especially the bearing housing portion, encounters a characteristic thermal movement as a result of variations in temperature, pressure, and piping arrangements. Since many of these varying factors change at varying rates during the transient period between ambient conditions and equilibrium operating conditions, and since many of these factors may be functionally interrelated, there may be a significant discrepancy between actual shaft movement or travel and calculated thermally-induced travel. It has been found that even identical machines may vary in their movement or "growth" through the transient period to operating equilibrium conditions.

Misalignment problems, as expected, have increased substantially recently due to the use of relatively high-speed apparatus. Unless the amount of relative movement between two coupled machines is known with a sufficient accuracy and unless the appropriate compensation can be made, the coupling portion between the machines must absorb the misalignment. An excessive amount of misalignment, especially at relatively high speeds, may decrease coupling life and may cause dangerous unexpected coupling failure.

Perfect alignment (exactly collinear axes) of shafts can seldom, if ever, be achieved at operating conditions without first knowing the thermal relationship of shafts to be aligned. As noted above, heretofore calculations were made to predict misalignment which could be expected as thermal equilibrium was reached, and the shafts were offset aligned to compensate for such calculated thermal effects. However, since these calculations may not necessarily reflect actual occurence, it has been necessary to reduce alignment tolerance to compensate for the possible errors in the calculated thermal expansion.

Since thermal growth or rise of driven apparatus and of driver apparatus from ambient to operating conditions cannot be satisfactorily predicted by calculation, it must be measured.

OPTICAL ALIGNMENT

Optical alignment is a measurement technique which has been used in the past in an effort to determine such thermal growth in turbomachinery. Conventionally, a high powered precision telescope is used to establish a known line of sight from which measurements can be made. Thermal growth is determined by subtracting a set of optical measurements, obtained while the machinery is shut down and at ambient conditions, from corresponding measurements taken at normal operating conditions.

Optical measurement, while useful, has inherent inaccuracies as evidenced by lack of repeatability and difficulties encountered in precisely gaging the often sizeable distances between target and shaft. In addition, problems may be encountered while making optical measurements as a result of poor lighting, vibration, and distortion from heat waves, steam, and oil vapors.

FACE-AND-HUB METHOD

Heretofore, measurements of shaft alignment have been made by methods and apparatus which required that the coupling arm be removed. For example, one widely used conventional method, sometimes referred to as the "face-and-hub" method, requires that a bracket be attached to one shaft and extend to the proximity of the coupling hub of the adjacent or second shaft. Two dial indicators are affixed to the end of the bracket in proximity to the coupling hub of the second shaft. A first of these dial indicators is positioned on the bracket such that the stem of the indicator rests on the outside periphery of the hub. A second of these dial indicators would similarly be positioned such that its stem portion would rest on the face of the hub. The bracket and shaft to which it is attached are then rotated in order to permit dial readings to be taken at a variety of positions around the periphery of the second shaft. The periphery readings may then be used to determine transverse displacement, (sometimes referred to as "offset") of the shafts, and the face readings may be used to determine angular displacement of the shafts. (Hereinafter, unless otherwise indicated, "offset" will be used to describe both transverse displacement and angular displacement of the shafts.)

However, this method is unsatisfactory for use as a thermal correction technique since all measurements must be made while the apparatus housing the shafts are shut down. As the apparatus cools, it will encounter thermal changes as the apparatus begins to assume ambient conditions. Changes in alignment at the rate of 1 mil-per-minute of cool-down have been experienced. Since the apparatus must not only be shut down, but also must be "uncoupled" to provide access to the face of one of the shaft hubs, a sufficient time may pass to prevent measurements from being taken at actual operating temperatures. In addition, misalignment may occur as a result of torque reactions or hydraulic or windage forces. These factors, which may be significant, are not measured by this method since these forces disappear when the apparatus is shut down. It can be seen, therefore, that such a technique is unsatisfactory for accurate shaft alignment at thermal equilibrium operating conditions; however, the method may be acceptable as a method of securing cold alignment data, as will become apparent below.

Methods and apparatus which may be suitable to practice the now conventional hub-and-face technique, or variations thereof, are disclosed in United States Letters Patent No. 2,833,051 to Cunningham; No. 2,815,582 to Karstens; and No. 2,516,854 to Christian.

"REVERSE DIALING METHOD"

Another method and apparatus conventionally used to align the shafts of coupled apparatus is often referred to as the "reverse dialing" technique. Like the face-and-hub method discussed above, this is a technique which is useful for making measurements while the shafts are not rotating.

In the case of the reverse dialing technique, conventionally, a bracket is attached to one shaft and extends to the proximity of the coupling hub of the adjacent or second shaft. A dial indicator is affixed to the end of the bracket in proximity to the coupling hub of the second shaft. This dial indicator is positioned on the bracket such that the stem of the indicator rests on the outside periphery of the shaft. The bracket and shaft to which it is attached are then rotated in order to permit dial readings to be taken at a variety of positions around the periphery of the second shaft. Readings are conventionally taken at four positions around the periphery of the shaft, viz., at 0°, 90°, 180°, and 270°.

After obtaining the above readings, a bracket is attached to the second shaft, and a dial indicator affixed to the bracket is used to look back at the periphery of the first shaft in a similar manner. The techniques of taking measurements from the first shaft to the second shaft and vice versa may, of course, be done simultaneously.

The set of coordinates thus obtained provides a representation of the respective center lines of the two shafts, and hence, is very useful in providing a relatively accurate determination of cold or ambient alignment. The data obtained from this reverse dialing technique provides, as in the case of the face-and-hub technique, data in connection with both transverse displacement and angular displacement of the shafts.

Methods and apparatus suitable to practice the now conventional reverse dialing technique are disclosed in United States Letters Patent No. 2,833,051 to Cunningham and in V. R. Dodd, "Shaft-alignment Monitoring Cuts Costs", Oil & Gas Journal, Sept. 25, 1972, p. 81.

It can be appreciated that since only the peripheries of the shafts are utilized for dial indicator readings in the reverse dialing method, the coupling arm does not have to be removed to provide cold alignment data. However, it can also be appreciated that this technique could not be utilized while the apparatus was under operating conditions.

It can be seen, therefore, that there is a need for a satisfactory method of measuring, under operating conditions, the changes in shaft alignment resulting from thermal growth of machinery.

BRIEF DESCRIPTION AND SUMMARY OF A PREFERRED EMBODIMENT OF THE INVENTION

In order to achieve satisfactory alignment at operating conditions, it is necessary to (1) accurately measure shaft relationship at ambient conditions and establish base alignment data, (2) monitor relative shaft position as the shaft passes from ambient to normal operating conditions, and (3) offset align the shafts at ambient conditions to compensate for the observed thermal movement in order to provide substantially coaxial alignment under operating conditions. The present method and apparatus are directed to providing coaxially aligned shafts operating under thermal equilibrium.

The present invention provides for accurately measuring thermally induced shaft movement of rotating apparatus. Once the extent of thermally induced movement under operating conditions is is known, the shafts are positioned at ambient conditions so that true coaxial shaft alignment results when the apparatus have reached thermal equilibrium operating conditions. It is apparent that that precise ambient alignment data must first be obtained in order to serve as a foundation for the later measurements and adjustments.

The apparatus of the present invention includes alignment bars which are connected to a portion of the thermally deformable housing of the apparatus whose shafts are to be aligned. An alignment bar is connected to each apparatus and extends substantially parallel to the centerline of the shaft of the respective apparatus. The bars are mounted on a non-rotating or non-moving portion of the apparatus which will incur thermal travel or rise as the apparatus passes from ambient conditions to equilibrium operating conditions. The bars are connected near the shaft but are spaced apart from the shaft. The bars which extend from each apparatus do not touch but do overlap. Measuring means are utilized to measure the relative movement between the bars, as the apparatus housing the shafts passes from ambient conditions to operating conditions. Because the bars are affixed to each of the apparatus housing the shafts to be aligned, the bars will respond to the thermally induced travel or rise or growth of the apparatus to thus accurately indicate the thermally induced travel or rise or growth of the shafts.

In preferred form the alignment bars are attached to the inboard bearing housing of each apparatus and overlap without touching to thus represent an offset projected centerline of the shafts of the two apparatus which might be, for example, a motor and a pump. Non-contacting transducer probes are used to measure the relative movement between the bars from an ambient or cold condition to an operating equilibrium or hot condition of the apparatus. These probes provide a measure of the thermally and pressure induced movement of the two shafts. The alignment bars are mounted on a non-rotating portion of the apparatus and, therefore, the measurements may be made while the apparatus is operating. A pair of spaced apart indicating blocks are mounted on one or more of the alignment bars and may be located directly above the connections of the coupling hub. A set of transducer probes on a probe bracket is mounted on a bar adjacent each of the indicating blocks. The probes on one bar are positioned to measure the relative horizontal and vertical movement of the indicating block on another bar. Each of the transducer probes measures the air gap between the probe and the indicating block. A proximitor amplifier unit conditions the electrical energy supplied to the probe and linearizes the return signal to relate to gap change in mil units. Readout meters are used to display the different movements in mils.

The present invention provides a method of aligning a pair of rotating shafts for operating under thermally stabilized and pressure equilibrium conditions. The relative alignment between a pair of non-rotating shafts at ambient temperature conditions is first determined. The shafts are then rotated under operating conditions for a time period at least sufficient to achieve thermal and pressure equilibrium between the shafts and the accompanying apparatus. The relative alignment between the shafts is measured while the shafts are rotated at thermal equilibrium conditions. The difference between the alignment of the shafts at ambient conditions and at thermal equilibrium conditions is determined, and the shafts are stopped and allowed to return to ambient conditions. The shafts are then offset aligned at ambient conditions an amount to provide for substantially coaxial alignment of the shafts when thermal and pressure equilibrium is reached at operating conditions.

OBJECTS OF THE INVENTION

It is, therefore, a general object of the present invention to provide a method and apparatus for use in substantially coaxially aligning rotatable shafts of apparatus operating at thermal equilibrium conditions which minimizes or reduces the problems of the type previously noted.

It is an object of the present invention to provide a method and apparatus for providing an accurate measure of shaft alignment of apparatus operating at thermal and pressure equilibrium conditions.

Also an object of the present invention is the provision of a method and apparatus for aligning rotatable shafts regardless of heat waves, steam and oil vapors surrounding the shafts.

A further object of the present invention is to substantially eliminate the use of optical methods and apparatus in the alignment of rotatable shafts.

Another object of the present invention is to provide a method and apparatus which will achieve improved accuracy of alignment of rotatable shafts.

Still another object of the present invention is to provide a method and apparatus which will substantially eliminate coupling failure or damage between apparatus having coupled, rotatable shafts.

Other objects and advantages of the present invention will become apparent with reference to the following detailed description of a preferred embodiment thereof in connection with the accompanying drawings, wherein like reference numerals have been applied to like elements, in which:

DETAILED DESCRIPTION OF THE PREFERRED EMBODIMENT

Figures 1, 2:
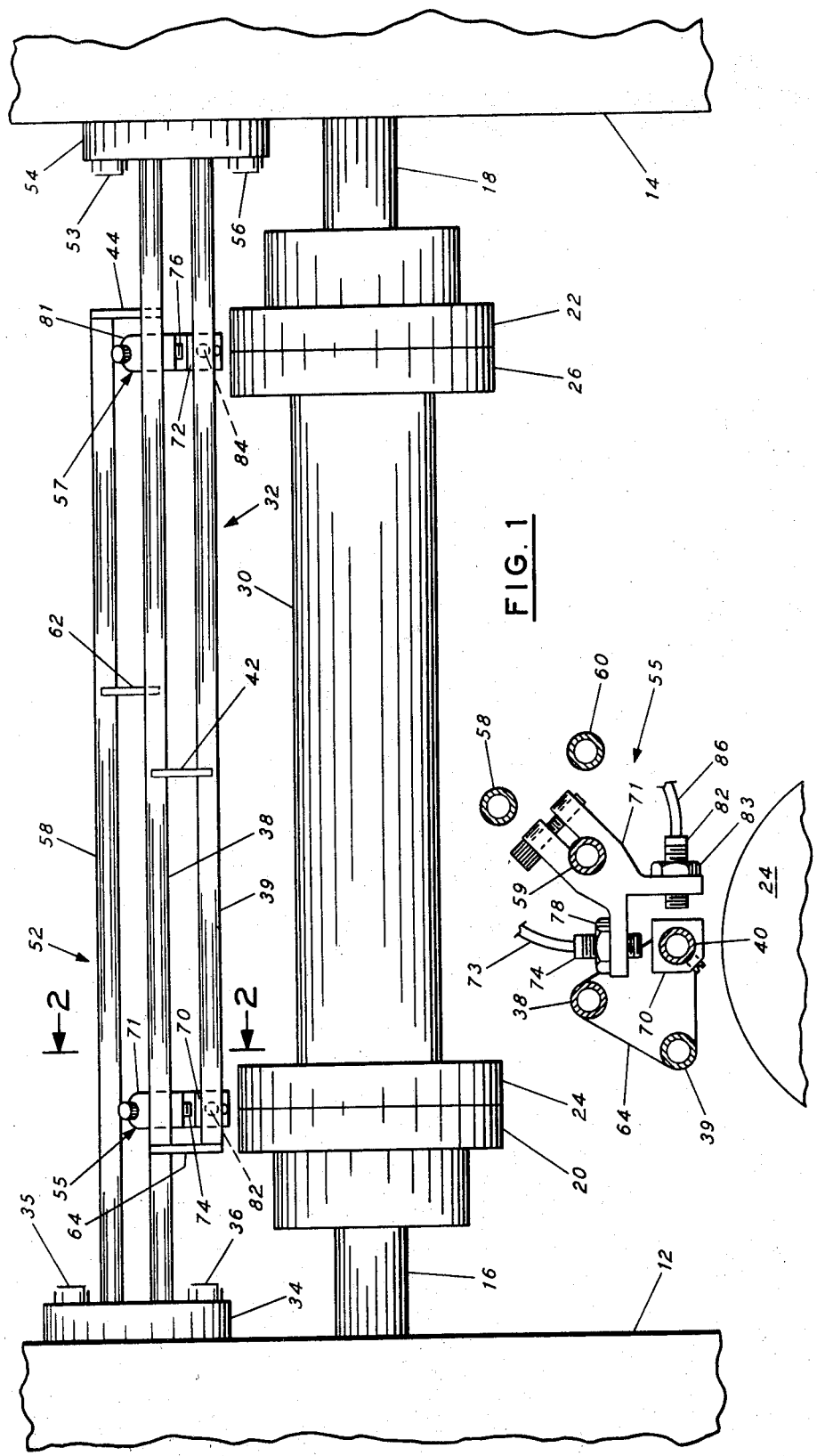
FIG. 1 is an elevation view illustrating the preferred embodiment of apparatus assembled in accordance with the present invention.
FIG. 2 is a sectional view taken at line 2—2 of FIG. 1.

FIG. 1 is an elevational view illustrating a preferred form of apparatus of the present invention connected in operable relationship between two apparatus 12 and 14 having shafts 16 and 18 respectively coupled for rotation. The rotating apparatus, for example, may be a driver apparatus such as a motor and a driven apparatus such as a pump or generator. The coupled shafts 16 and 18 must be accurately aligned under operating conditions to prevent undesirable wear, vibration, or failure. The ends or termini of the shafts 16 and 18 are provided with end plates or hubs 20 and 22 which are connected to the end plates 24 and 26 of a coupler 30. The present invention provides change measuring means for obtaining information to be used in aligning the shafts 16 and 18 so that they are substantially coaxial under operating conditions.

A first alignment bar means generally indicated by the reference number 52 has one end 34 mounted to the housing of the driver apparatus 12 in close proximity to the shaft 16. The alignment bar extends in substantially parallel relationship with the projected centerline of the shaft 16 and may be considered an offset projection of the centerline of that shaft. It has been found satisfactory to mount the alignment bar means 52 on the bearing housing of the apparatus since this is a relatively thermally stable non-rotating portion of the apparatus. The mounting is accomplished by suitable bolts 35 and 36.

In preferred form, the alignment bar means 52 comprises three triangularly spaced apart tubular rods 58, 59 and 60 which are shown in cross section in FIG. 2. The rods 58, 59 and 60 are supported by braces 44 and 62 so that they are maintained in fixed, spaced apart relationship. This triangular spaced apart arrangement of the rods provides enhanced rigidity to substantially eliminate undesirable deflecting interference which may occur with the elongated alignment bar means without additional reinforcement as a result of bar deflection and windage and other normally experienced forces occurring in the vicinity of the rotating shafts during operation.

A second alignment bar means generally indicated by the reference number 32 has one end 54 mounted to the housing of the driven apparatus 14 by suitable bolts 53 and 56 in a manner to extend parallel to an offset projected centerline of shaft 18. The alignment bar means 32 and 52 do not make contact (see FIG. 7) but are closely spaced apart. In the preferred form, the alignment bar means 32 comprises triangularly spaced apart rods 38, 39 and 40 (see FIG. 2). Supporting braces 42 and 64 are used to maintain the bars in fixed, spaced apart relationship in a manner similar to that discussed above in connection with supporting braces 44 and 62.

Spaced apart measuring means, generally indicated by the numbers 55 and 57, are used to measure the relative movement between the alignment bars 32 and 52 as the respective housings of apparatus 12 and 14 pass from ambient conditions to operating conditions. The thermal growth or travel of the housings of both the drivr unit and the driving unit cause a change in alignment of their respective shafts as a result of new forces acting upon the shafts when the units are operating. That is to say, as a result of thermal growth, a distortion of the housings of the units may cause the respective shafts to assume a changed alignment. The present invention provides a novel method and apparatus for determining the respective changes in alignment which occur between ambient conditions and equilibrium operating conditions. Thus, the movement of the shafts as the apparatus passes from ambient conditions to operating conditions may be continuously measured and monitored, and the shafts of the apparatus may be offset aligned at ambient conditions to provide for substantially coaxial alignment under opeating conditions.

The preferred measuring or displacement sensing means comprises non-contacting transducer probes. The non-contacting transducer probes are used to measure the relative movement between the bars, thus indicating the thermally induced movement of the two shafts. The alignment means 32 and 52 are mounted on a non-rotating portion of the apparatus housing shafts to be aligned. In one embodiment of the apparatus of the present invention, a pair of spaced apart indicating blocks 70, 72 are mounted on one of the alignment bars 38, 39 or 40 of alignment bar means 32 and are preferably located directly above the terminal connections of the coupling hub 30. Adjacent each of the indicating 70, 72, there is mounted a set of two remotely operable proximity sensing means comprising transducer probes 74, 82 and 76, 84, each set being supported by a probe bracket 71 and 81 respectively on a bar 59 of the other bar means 52. As may be seen in FIG. 2, the probes are positioned to measure the horizontal and vertical movement of each indicating block. The transducer probe measures the air gap between the probe and the indicating block, and a proximitor amplifier unit or operating means 100 conditions the electrical energy supplied to the probe, receives a signal responsive to changes in the air gap, and linearizes the return signal to 100 or 200 millivolts (whichever is desired) per mil of gap change. Read-out meters are used to display the different movements in mils.

It will, of course, be appreciated that the transducer probes themselves need not necessarily be mounted horizontally or vertically so long as the probes measure movement which may functionally relate to horizontal and vertical movement. The horizontal and vertical planes are chosen as convenient references since a sufficiently large number of apparatus exist which may conveniently be adjusted with respect to these planes. However, other reference planes may be used in the practice of this invention.

In a preferred form of the present invention the alignment bars will withstand coupling windage forces normally experienced without deflection interference. Tubular bars are deposed in a triangular arrangement with supporting stiffeners between the tubes. Where practical, the alignment bars should be located inside the coupling guard of the rotating apparatus. Alignment bars located on bearing housings and inside coupling guards may operate in a controlled temperature atmosphere and may be thermally stable.

Figure 7:
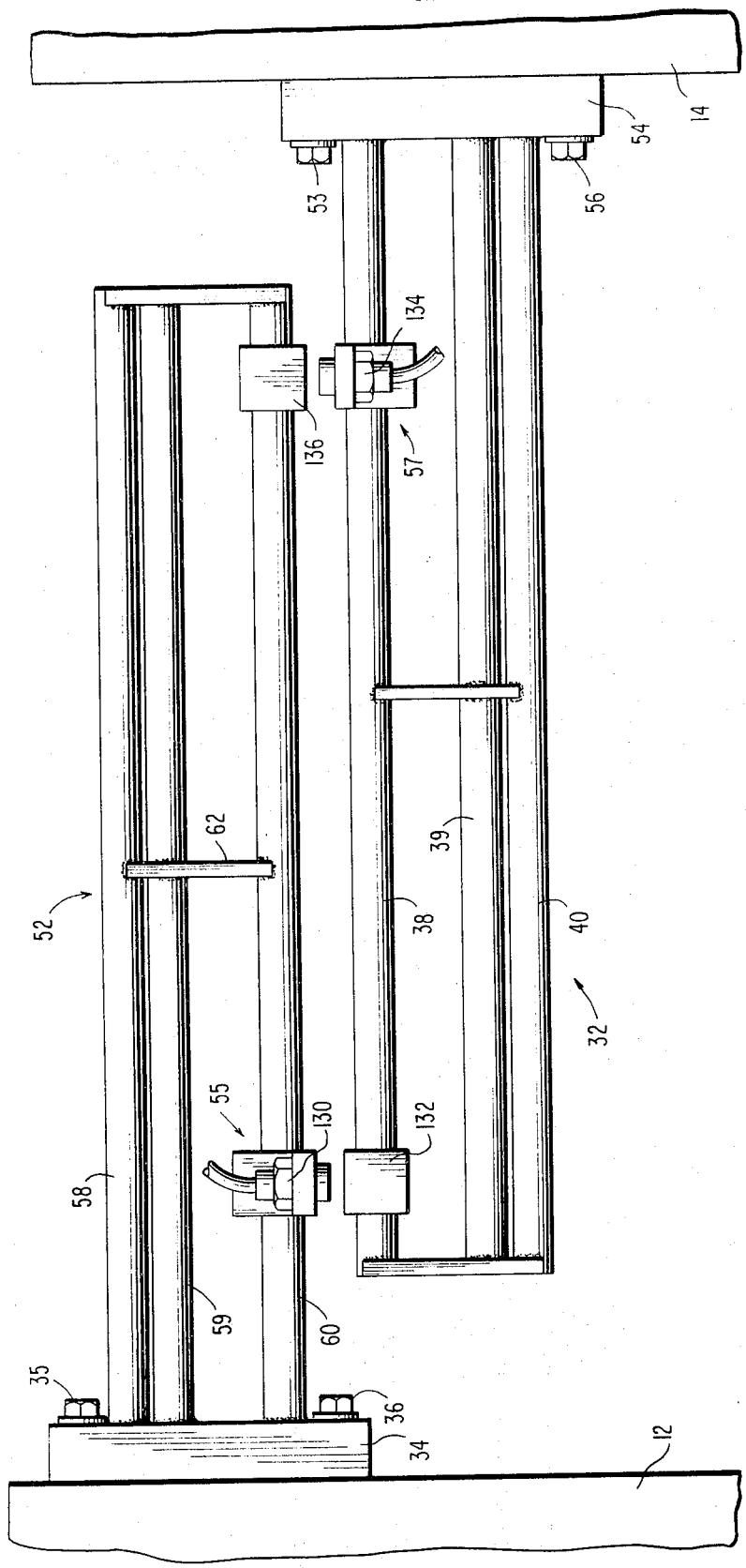
FIG. 7 is a plan view illustrating the preferred embodiment of apparatus assembled in accordance with the present invention and wherein measuring means have been mounted on both bar means in a modified fashion.

In FIG. 7, there is shown another arrangement embodying the apparatus of the present invention. This arrangement is similar to that shown in FIG. 1 except that one bar may have attached thereto both an indicating block and a probe assembly which would correspond respectively to a probe assembly and indicating block attached to a second bar.

Figure 3:
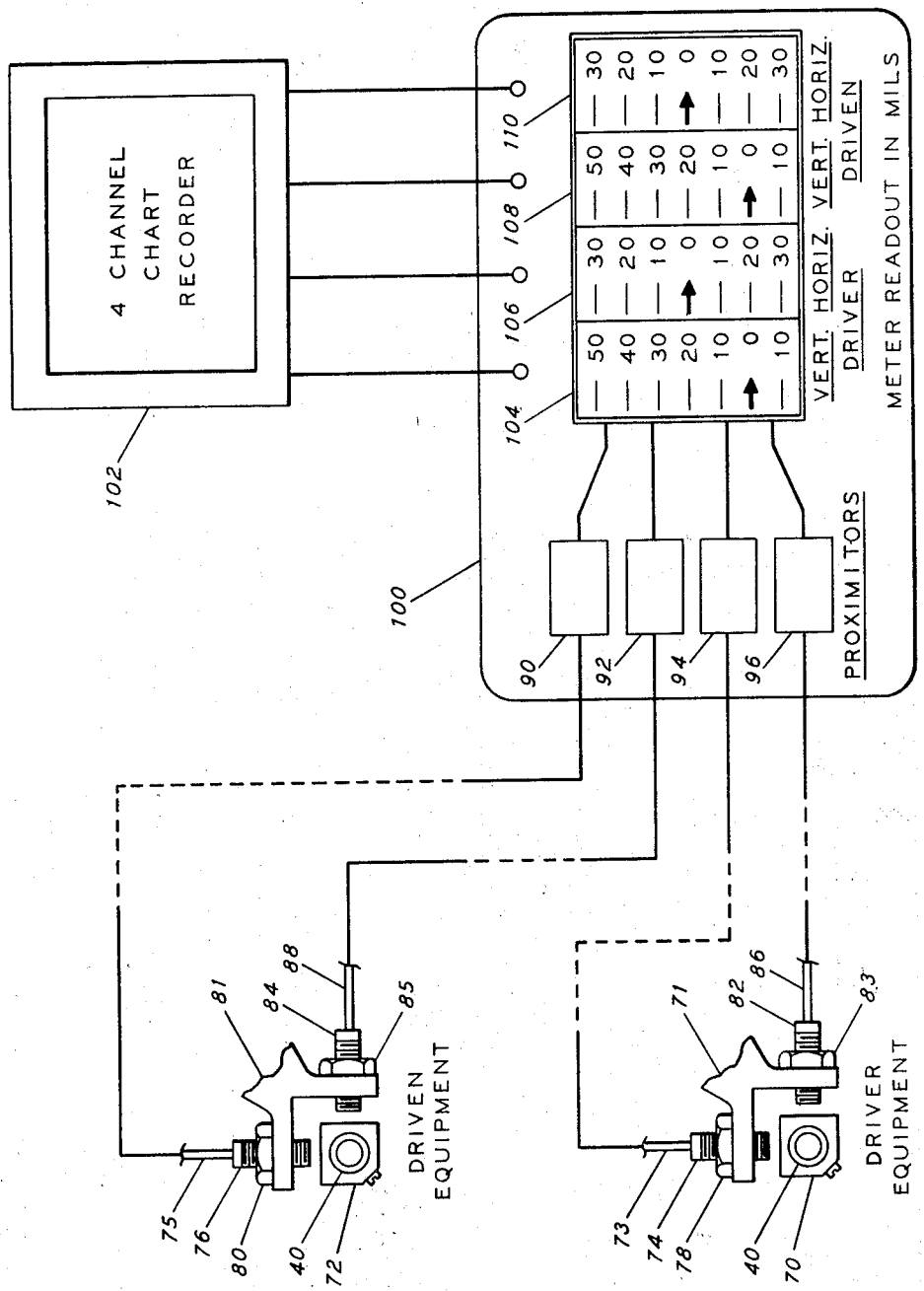
FIG. 3 is a schematic view illustrating the readout arrangement of the present invention.

FIG. 3 schematically illustrates the manner in which the indicating blocks or reference means 70, 72 and the probes 76, 84, 74, 82 cooperate to measure or sense the movement between the alignment bars. Thus the non-contacting transducer probes are utilized to measure the relative movement between the alignment bars to indicate the thermally-induced travel of the two shafts between cold or ambient conditions and hot or operating equilibrium conditions. The alignment bars, made for example of aircraft-frame tubing, are mounted as near the shaft's centerline as practicable. Indicating blocks 72, 70 are mounted, for example as shown in FIG. 1, on the bar fastened to the driven apparatus. Four proximity probes 76, 84, 74 and 82 and two probe brackets 81 and 71 are then mounted on the bar attached to the driver. The probes and indicating blocks are positioned to measure the horizontal and vertical (see FIG. 2) movement at each coupling hub. The proximity probes measure the air gap between the probe and indicating block. Proximitor signal receiving means or amplifying units 90, 92, 94 and 96 of operating and display means 100 condition the electrical energy supplied to the probe and linearize the return signal to 100 (or 200) millivolts per mil of gap change. The proximitor output signal is routed to read-out meters 104, 106, 108 and 110 calibrated to display the differential movement in mils in display and operating means 100. The entire movement pattern of the apparatus housing the rotating shafts can be recorded on a chart recorder 102 and thus plotted against time. Permanent records are useful for developing an alignment envelope for individual apparatus. In addition, it is useful to know a machine's alignment cycling pattern over long periods of time.

In accordance with the invention, the alignment method set out below is effective in substantially eliminating misalignment problems. First, cold alignment data should be obtained using conventionally available methods. Two readily available conventional methods known as the face-and-hub method and the reverse dialing method (both of which are discussed above), may be utilized to obtain such data. It is preferred to use the reverse dialing method.

If there is expected thermal misalignment, the apparatus should then be offset aligned to attempt to compensate for the expected thermal effect. The expectation of thermal misalignment may result from previous thermal expansion measurements or manufacturers' data. If these are not available, the apparatus should be offset aligned for expected thermal movement using calculated or other estimated methods. If no thermal movement is expected then the apparatus should be substantially coaxially aligned.

After the alignment bars are installed, the cold alignment base data is used to provide a measurement reference. As already noted, the cold alignment base data may be provided by utilizing either the face-and-hub technique or the reverse dialing technique. The bar installation should be made with the apparatus at the same ambient conditions as when the cold data was taken. The apparatus housing the shafts is then started up, and the read-out from the bars is used to monitor the change in alignment of the bars as the apparatus passes from cold to normal operating conditions. A graphical representation of the alignment of the apparatus may then be plotted for both ambient alignment and operating alignment. Using the data obtained from the read-out while the apparatus operates at thermal equilibrium to graphically represent the center lines of the shafts may be helpful in determining the amount of offset alignment at ambient conditions necessary to achieve satisfactory shaft relationship at normal, operating conditions. It is, of course, desirable to have substantially coaxial alignment at operating conditions; however, this is often not economically feasible, so the present method may be used to provide an acceptable and economic alignment under operating conditions.

Figure 4:
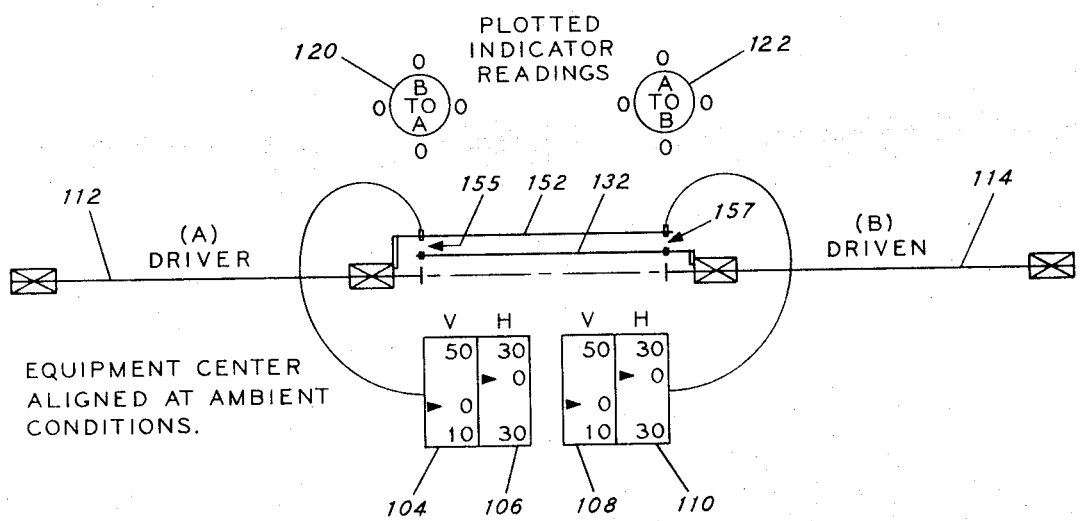
FIGS. 4–6 are schematic views illustrating the practice of the present invention.
Figure 5:
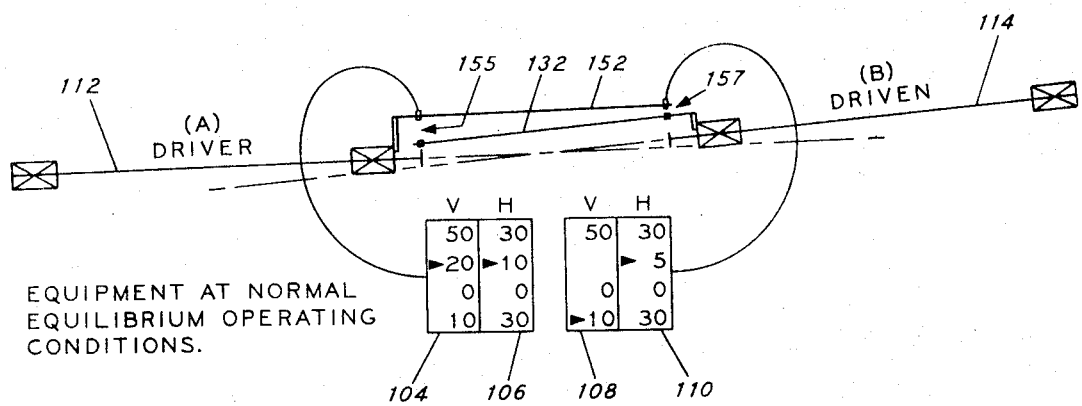
Figure 6:
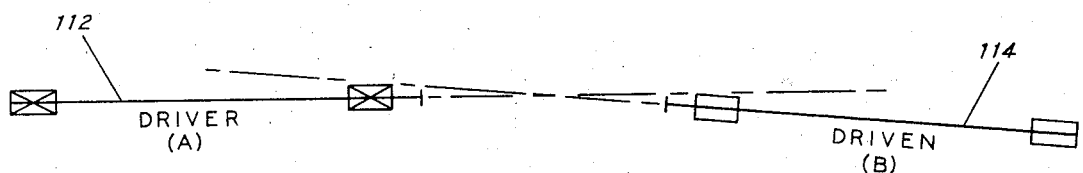

Schematic views illustrating the practice of the present invention are shown in FIGS. 4, 5, and 6. A schematic view of a rotatable shaft 112 of a driver apparatus "A" is shown coupled to a rotatable shaft 114 of a driven apparatus "B". An alignment bar 152 is connected to a non-rotating portion of the driver apparatus "A" and extends substantially parallel to the projected centerline of shaft 112. A second alignment bar 132 is connected to a non-rotating portion of the driven apparatus "B" and extends substantially parallel to the projected centerline of shaft 114. Non-contacting transducer-probe sensing means, indicated generally by the numbers 155 and 157, are connected to the alignment bar 152 to measure the relative movement between the bars 152 and 132. The movement of the bars in both vertical and horizontal planes is detected by the sets of transducer probes. These transducer probes produce a signal which is conditioned by a set of proximitors. These proximitors provide an output such that the relative displacement of the bars may be indicated in mils in the meter read-outs 104, 106, 108 and 110.

In accordance with the method of the present invention, the driver apparatus "A" and the driven apparatus "B" are first aligned in a cold or ambient condition utilizing conventional aligning methods. Preferably the reverse dialing method is used as described above. In the example shown in FIG. 4, the shafts 152 and 132 of the two apparatus are coaxially aligned at ambient conditions. Indicator plots 120 and 122 show the readings obtainable from using a conventional cold alignment method which may be used to align the shafts of the two apparatus at ambient conditions. As shown in FIG. 4, the plotted indicator reading graphs 120 and 122 contain all zeros. The non-contacting probes 155 and 157 and their corresponding read-out meters have been adjusted to reflect such ambient coaxial alignment. This adjustment at ambient conditions is indicated by the arrows of meters 104, 106, 108 and 110 which have been made to point to zero.

FIG. 5 schematically depicts the alignment of the apparatus at normal equilibrium operating conditions. It is noted that due to the thermal expansion effects of the two apparatus, the read-out meters 104, 106, 108 and 110 indicated a change in the alignment of the shafts 112 and 114. This misalignment is indicated by a reading of plus 20 in the vertical direction in meter 104; plus 10 in the horizontal direction in meter 106; a reading of minus 10 in the vertical direction in meter 108 and a reading of plus 5 in the horizontal direction in meter 110. If desired, the read-out from the alignment bars may be converted from the meter readings on meters 104, 106, 108 and 110 to plotted indicator readings to assist in determining the amount of offset alignment at ambient conditions necessary to achieve desired shaft relationship at normal operating conditions.

With the alignment data at ambient conditions and the alignment data at operating conditions, the apparatus may be offset aligned at ambient conditions to provide for desired alignment at operating conditions to counteract thermal effects. As shown in FIG. 6, the operating alignment information is utilized to offset align the apparatus at ambient conditions in a direction opposite to the direction of displacement at operating conditions in order to achieve substantially coaxial alignment at equilibrium operating conditions.

The amount and direction of ambient displacement required to achieve equilibrium alignment may be determined conventionally from the readings of meters 104, 106, 108, 110. In this connection, "Shaft-alignment Monitoring Cuts Costs," Oil and Gas Journal, Sept. 25, 1972, p. 91, by V. R. Dodd is incorporated hereinto as an example of a procedure for determining offset alignment from data obtainable from the present invention. Because alignment adjustments to the apparatus are conventionally made with shims having thicknesses in multiples of one mil, the meter read-out in actual mil-displacement greatly facilitates the offset alignment procedure.

From the data thus obtained, shim adjustments and side-to-side movements may be made using well known techinques. In most cases, both vertical and horizontal alignment corrections can be accomplished in one move by the use of several strategically located indicators on the apparatus to be moved. Although the corrective adjustment may be plotted on suitable graph paper, mathematical computations probably offer greater accuracy. The final alignment data at normal operating conditions should be recorded. Periodic alignment checks will then reveal any changes induced through foundation settlement, piping strain, temperature changes and other factors.

FIG. 7 is a plan view illustrating the preferred embodiment of the apparatus assembled in accordance with the present invention and wherein sensing means have been mounted on each of the bar means. In a similar manner to the embodiment described in FIG. 1, a first alignment bar means generally indicated by the reference number 52 has one end mounted to the housing of the driver apparatus 12 in close proximity to the shaft (not shown). The alignment bar has a predetermined orientation with respect to the projected center line of the shaft and may be functionally related to an offset projection of the center line of that shaft. It has been found satisfactory to mount the alignment bar means 52 on the bearing housing of the apparatus since this is a relatively thermally stable non-rotating portion of the apparatus. The mounting of the alignment bar means to the bearing housing may be accomplished in any suitable manner, for example, by bolts 35 and 36.

The alignment bar means 52 comprises three triangularly spaced apart tubular rods 58, 59, and 60. These rods may be supported by a brace 62 in order to maintain the tubular rods in fixed, spaced apart relationship. As noted above, this triangular spaced apart arrangement of the rods provides enhanced rigidity to substantially resist undesirable deflection.

Similarly, a second alignment bar means generally indicated by the reference number 32 has an end mounted to the housing of the driven apparatus 14 by suitable fastening means such as bolts. This second alignment bar means 32 is arranged so as to have a predetermined orientation with respect to the shaft (not shown) of the driven apparatus 14. As noted above, it may be preferable to arrange both the first and second alignment bar means 52 and 32 respectively in such a manner so as to extend parallel to the offset projected center line of each of the respective shafts of the apparatus 12 and 14, respectively.

Spaced apart measuring means generally indicated by the numbers 55 and 57, are used to measure the relative movement between the alignment bar means 32 and 52 as the apparatus 12 and 14 pass from ambient conditions to operating conditions. The arrangement of the spaced apart measuring means is similar to that shown in FIG. 1 except that alignment bar means 52 carries a non-contacting transducer probe 130 and the alignment bar means 32 carries an indicating block 132 which cooperates with the probe 130 to provide alignment data. In a corresponding manner, alignment bar means 32 carries a non-contacting transducer probe 134 which cooperates with an indicator block 136 mounted on alignment bar means 52 to provide alignment data. As noted above, each transducer probe essentially measures the gap between the probe and the indicating block, and a proximitor amplifier unit conditions the electrical energy supplied to the probe and linearizes the return signal to correspond to the air gap. Readout meters may be used to display the extent of the relative movement of the probe and indicator block in any convenient unit of linear measure, e.g., mils.

Although not illustrated in FIG. 7, it will be appreciated that indicator means 55 includes another non-contacting transducer probe disposed 90° away from transducer probe 130. Similarly, indicating means 57 includes a second non-contacting transducer probe also disposed 90° from probe 134. By providing two transducer probes for each of the indicating means 55 and 57, a set of "horizontal" and "vertical" readings may be made at each location.

In a manner similar to that discussed in connection with FIGS. 4, 5, and 6, vertical and horizontal readings may be provided to enable alignment of the shafts of apparatus 12 and 14 in a manner analogous to the conventional reverse dialing technique. Because the procedure used for offset aligning apparatus 12 and 14 has already been substantially described in connection with FIGS. 4, 5, and 6, there is no need to repeat the same here. It will be appreciated, however, that the proximitor amplifiers may be conventionally adjusted in order to provide proper correspondance for the read-out meters appropriate for the new arrangement of the transducer probes as shown in FIG. 7.

Figure 8:
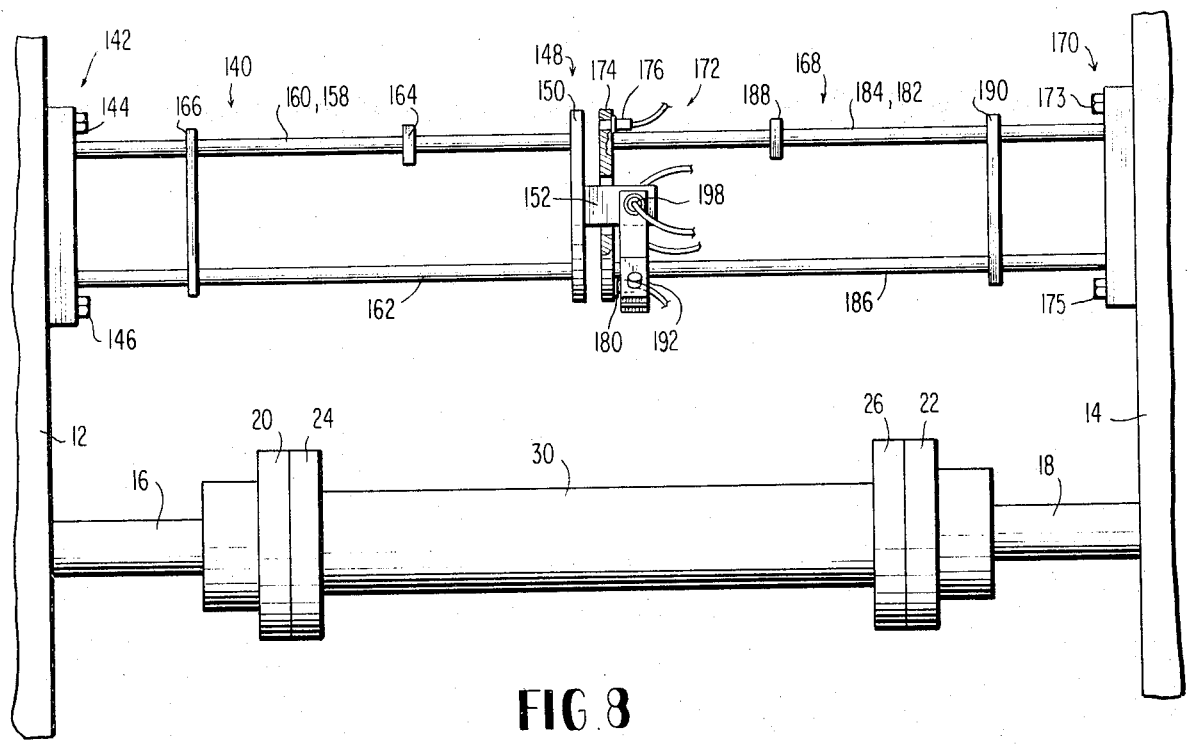
FIG. 8 is an elevation view illustrating an alternative embodiment of apparatus assembled in accordance with the present invention.

FIG. 8 is an elevational view illustrating an alternative embodiment of apparatus assembled in accordance with the present invention. This embodiment is connected in operable relationship between the apparatus 12 and 14 having shafts 16 and 18 respectively coupled for rotation. The end of shaft 16 is provided with an end plate or hub 20 which in turn is connected end plate 24 of the coupler 30. Similarly, shaft 18 is provided with a hub 22 which in turn is connected to the end plate 26 of the coupler 30.

A first alignment bar means generally indicated by the reference number 140 has one end 142 mounted to the housing of the driver apparatus 12 in close proximity to the shaft 16. The alignment bar means 140 extends in substantially parallel relationship with the projected center line of the shaft 16 and may be considered an offset projection of the center line of that shaft. It will, of course, be appreciated that any predetermined orientation of the projected center line of the shaft 16 and the alignment bar means 140 may be utilized.

It has been found satisfactory to mount the alignment bar means 140 on the bearing housing of the apparatus 12 since this is a relatively thermally stable non-rotating portion of the apparatus. The mounting may be accomplished by any suitable means such as by bolts 144 and 146.

At the other end 148 of the alignment bar means 140, there is connected a projected face plate 150. The plate 150 is a circular disc having approximally the same diameter as a cross section of the hub 20. Whereas a projected face plate 150 having a diameter either greater or smaller than the diameter of the hub 20 may be utilized, using the same diameter may give quite satisfactory results.

A rectangularly shaped indicating block 152 is attached to the center of the face plate 150. The block 152 is generally arranged such that when the elongate bar means is attached to the apparatus 12, the indicating block 152 has a face 154 functionally related to the horizontal (see FIG. 9).

The alignment bar means 140 comprises three triangularly spaced apart tubular rods 158, 160, and 162. The rods 158, 160 and 162 may be supported by braces 164 and 166 so that the rods are maintained in fixed, spaced apart relationship.

A second alignment bar means generally indicated by the reference number 168 has one end 170 mounted to the housing of the driven apparatus 14 by any suitable means which may include bolts 173 and 175. The bar means 168 is positioned having a predetermined orientation with respect to an offset projected center line of shaft 18. A probe support torus 174 is attached to the other end 172 of the second alignment bar means 168. In a preferred form of the embodiment shown in FIG. 8, non-contacting transducer probes are attached to the torus 174. As may be seen in FIG. 9, probes 176, 178, 180, 181 may be equally spaced on the torus 174. A probe bracket 192 is attached by any suitable means e.g., a set screw 194, to the rod 176. This probe bracket carries on a vertical portion 196, a non-contacting transducer probe 198. Similarly, a horizontal portion 200 of the probe bracket 192 carries a non-contacting probe 202. The probes 198 and 202 cooperate with faces 154 and 156 of the indicating block 152 in order to measure the relative horizontal and vertical movement (sometimes referred to as "offset") of the shafts 16 and 18. The probes mounted on the torus 174 cooperate with surface 151 of the plate 150 to provide an indication of the relative angular displacement of the shafts 16 and 18.

As noted above, the proximity probes cooperate with amplifying units and read-out meters in order to provide an indication of alignment of the shafts during thermal equilibrium operating conditions. The amplifying unit and read-out meters may be the same as that described in connection with the embodiment shown in FIGS. 1–3. As noted above, the entire movement pattern of the apparatus housing the rotating shafts can be recorded on a chart recorder and thus plotted against time to provide for a permanent record of the alignment envelope for the apparatus. It will, of course, be appreciated that an indicating block having a shape other than a rectangle may be utilized in the practice of this invention. Moreover, the probe holder bracket 192 may be attached to any of the rods 182, 184, or 186 in order to provide an indication which may be functionally related to relative horizontal and vertical displacement of the shafts 16 and 18.

Figure 9:
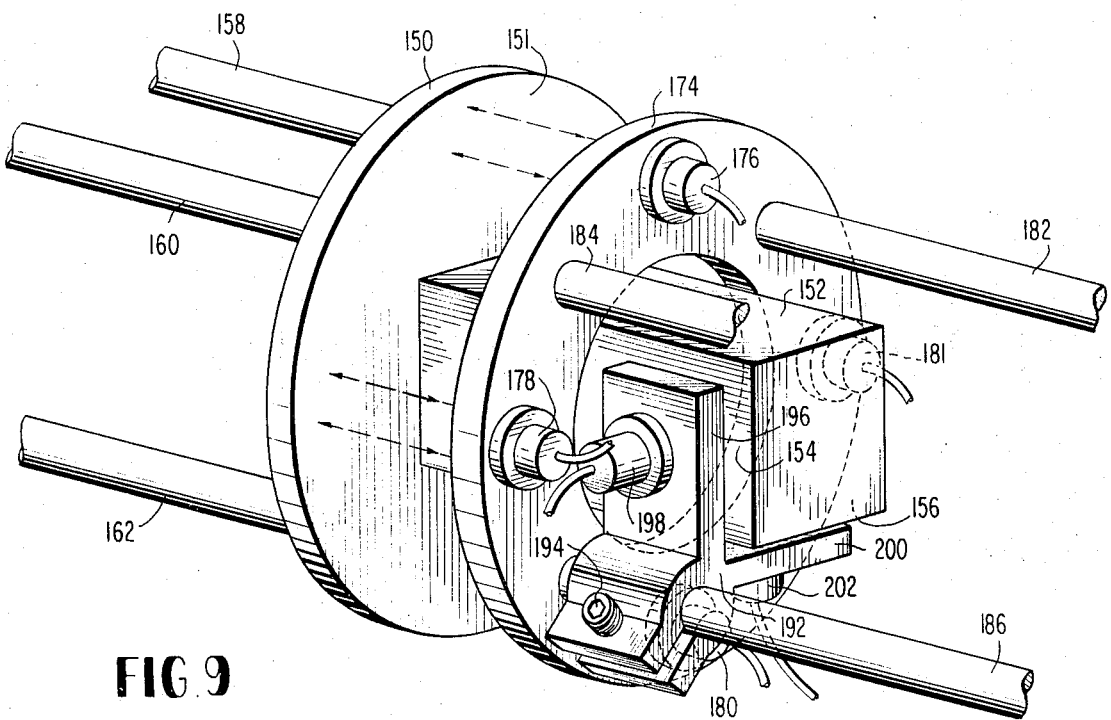
FIG. 9 is a more detailed elevation view of a portion of the apparatus shown in FIG. 8.

The data obtained from the alternative embodiment shown in FIGS. 8 and 9 may correspond to the data obtained from the conventional face-and-hub technique (which, as noted above, may only be used when apparatus is in a nonoperating ambient condition) in order to provide appropriate horizontal and vertical and angular displacement of the apparatus to appropriately offset the shafts to provide substantial coaxial alignment of the shafts when the apparatus in operating under equilibrium conditions.

The alignment bars and the alignment method of the invention have been successfully used on a wide variety of equipment from simple end-suction centrifugal pumps with electric motor drivers to complex high-speed centrifugal compressors, gear boxes, steam and gas turbines. The demonstrations set out below are typical installations in which the present invention is useful.

DEMONSTRATION NO. 1

Hot Oil Pump Vibration

A hot oil pump with a 200 H. P. electric motor driver operating at 665°F developed an 8 mil vibration during initial plant startup. The rotating element was checked and found to be balanced within specifications. Original conventional alignment was performed under what was considered to be near operating conditions. Hot stock was bypassed around discharge line check-valve and back-flowed through pump for several hours. Unsuccessful conventional hot alignment checks were made by shutting the apparatus down, parting the coupling and mounting dial indicators. After approximately four weeks of operation, the couplings' flex disc failed. At this point the alignment bars of the present invention were installed and alignment monitored from warm-up to operating temperatures. A surprising 120 mils vertical misalignment was recorded under operating conditions. Vibration amplitude increased in proportion to misalignment. The pump was offset aligned at ambient conditions to compensate for the recorded thermal growth. The pump was restarted and vibration level and alignment monitored. Startup vibration amplitude was 7 mils, but gradually subsided to 1 mil as thermal movement brought the shafts into collinear alignment.

DEMONSTRATION NO. 2

Induced Draft Fan Vibration

Excessive vibration existed on a flue gas fan (800°F), located on top of a furnace. In-place and precision shop balancing of the rotating element was performed. Vibration amplitude was reduced but remained above acceptable limits. Additional structural bracing, increased foundation mass, and other vibration-reducing methods failed to solve the problem. After installation of the alignment bars of this invention the alignment and vibration were monitored simultaneously and found to be related. After realigning the fan and motor, the vibration amplitude was reduced from 10 mils to an acceptable 2½ mils.

DEMONSTRATION NO. 3

Feed Pumps

Internal seizure of the center bushing and shaft caused failure of nine-stage feed pump during startup. The pump operates at a discharge temperature of 400°F and is powered by a 225 H. P., 3600 RPM electric motor. Misalignment was suspected as a contributing failure factor. The hot alignment was monitored with the alignment bars of the invention and found to be greater than expected from calculations. The expected pump rise was 5 mils. The measured thermal movement under normal running conditions revealed that the pump rise was 15 mils in excess of the motor. In accordance with the invention an identical pump was offset aligned prior to run-in and alignment monitored during test run. The seizure problem also occurred on the second pump. However, misalignment was eliminated as a contributor. Further inspection revealed the source of the problem allowing quick solution without losing time testing alignment theory.

DEMONSTRATION NO. 4

Misalignment Eliminated as a Source of Vibration on a Centrifugal Compressor Train The machines discussed here are gas turbines with a speed increaser and two stages of centrifugal compressors. The compressors are barrel-type design and are centermounted. The suction and discharge piping is located on top of the compressors. The piping approaches the machine 90° relative to the shaft centerline. Two different vibration problems were experienced. These were (1) first case vibration sensitive to speed and load, and (2) second case vibration directly related to discharge temperature.

Alignment bars of the invention were designed and installed on the complete train as a part of the original monitoring equipment. Great pains were taken to offset align in accordance to manufacturers recommendations. Precautions were taken to assure good alignment free from pipe strain and other influencing factors.

(1). First Case Vibration

During initial run-in of the train it was obvious that a serious vibration problem existed in the drive-thru of the first stage compressor. Hot alignment data obtained from alignment bars revealed that both compressors were within reasonable tolerances. Therefore, misalignment was ruled out as a contributing vibration factor. However, the compressors were operating in a closed loop, not at optimum operating conditions. Further alignment data was necessary. Cold alignment data was taken and studied in relation to normal operating alignment. Adjustment of the alignment between turbine and gear was recommended even though vibration levels for both turbine and gear were normal.

(2). Second Case Vibration

A second vibration problem occurred after the machine was put in operating service. Shaft vibration on the coupling-end bearing was sensitive to the compressor discharge temperature. At a discharge temperature of 140°F vibration was 0.8 mil. Misalignment was again suspected when the vibration amplitude increased to 2 mils as the discharge temperature was raised to 240°F.

The second case discharge temperature was then varied from 140°F to 270°F. Comparative readings of vibration, temperature and alignment were recorded. Vibration increased from 1 mil to 2 mils while the alignment change was only 5 mils. Vibration and alignment were not directly related as the alignment move occurred after the vibration increase. It was concluded that the alignment was within the normal tolerance at the elevated temperatures and was not associated with the vibration increase.

SUMMARY OF ADVANTAGES AND SCOPE OF THE INVENTION

The above Demonstrations illustrate the utility of the present method of alignment over a broad range of equipment. It will be appreciated that in constructing apparatus for shaft alignment and in practicing the method according to the present invention, certain significant advantages are provided.

In particular, the present invention provides a means for making relatively accurate measurements of shaft movement under operating conditions. These measurements may be made with improved repeatability and without interference from such factors as heat waves, steam and oil vapors in the vicinity of the shafts. In addition, the present invention may provide for extended life of coupling hardware since shaft alignment may be continuously monitored during operation.

Of independent significance is the accurate data provided by the present invention while the shafts are under operating conditions. With such data and reliable cold alignment data, one skilled in the art may offset align the apparatus housing the shafts at ambient conditions to provide the desired alignment at operating conditions.

Thus it is apparent that there has been provided, in accordance with the present invention, a method and apparatus for shaft alignment that substantially satisfies the objects and advantages set forth above. Although the present invention has been described in conjunction with specific embodiments thereof, it is evident that many alternatives, modifications, and variations, will be apparent to those skilled in the art in light of the foregoing disclosure. Accordingly, it is intended that all such alternatives modifications, and variations, which fall within the spirit and scope of the invention as defined in the appended claims, be embraced thereby.

What is claimed is:

1. Apparatus for aligning a pair of rotatable shafts for operation under thermal equilibrium conditions comprising:
    change measuring means operably responsive to thermal changes tending to change the relative alignment between said shafts while said shafts are rotated and said apparatus changes from an at-rest ambient condition to a thermal equilibrium operating condition to measure changes in relative alignment between said shafts;
    said change measuring means comprising
      a plurality of spaced elongate means including
        a first elongate member, and
        a second elongate member,
        said first elongate member having a predetermined orientation with respect to a projected center line of a first of said shafts, and
        said second elongate member having a predetermined orientation with respect to a projected center line of a second of said shafts,
        said first and second elongate members being operable to respond to, and undergo relative movement in accordance with, a change in alignment between said projected center lines of said shafts, and
      sensing means included with said elongate means and operable in response to said relative movement of said first and second elongate members to detect changes in the relative alignment of said shafts while said shafts pass from said at-rest ambient condition to said thermal equilibrium operating condition;
    said first elongate member comprising
      first mouting means fixedly secured relative to said first shaft, and
      a first plurality of mutually spaced bar means extending generally longitudinally of said first shaft and connected with said first mounting means,
      said first plurality of bar means defining a polygonal cross section for said first elongate member, oriented transversely of the longitudinal axis of said first shaft,
    said second elongate member comprising
      second mounting means fixedly secured relative to said second shaft, and
      a second plurality of mutually spaced bar means extending generally longitudinally of said second shaft and connected with said second mounting means, said second plurality of bar means defining a polygonal cross section for said second elongate member oriented transversely of the longitudinal axis of said second shaft,
    said sensing means comprising
      remotely operable proximity sensing means carried by said elongate means,
      reference means carried by said elongate means, spaced from said remotely operable proximity sensing means, and disposed in non-contacting relation therewith, and
      operating means located remote from said remotely operable proximity sensing means and operable to remotely control the operation thereof;
    said reference means and said remotely operable proximity sensing means being so carried by said first and second elongate members as to be relatively displaceable in accordance with relative displacement of said first and second elongate members;
    said remotely operable proximity sensing means being operable, while being remotely controlled by said operating means, to continuously sense the proximity of said remotely operable proximity sensing means relative to said reference means while being continuously spaced therefrom;
    display means operable in response to said remotely operable proximity sensing means to display an indication of said proximity of said reference means with respect to said remotely operable proximity sensing means; said remotely operable proximity sensing means cooperating with said reference means, while being continuously spaced therefrom, to detect at least a function of relative horizontal displacement of at least said first and second elongate members, and relative vertical displacement of said first and second elongate members;

said remotely operable proximity sensing means cooperating with said display means to provide a continuous display of said indication of proximity of said reference means with respect to said remotely operable proximity sensing means over a period of operating time while said thermal equilibrium condition is being achieved and provide a display indicative of at least said functions of said relative horizontal and vertical displacement of said first and second elongate members occurring as said apparatus changes from said at-rest ambient condition to said thermal equilibrium operating condition; and said remotely operable proximity sensing means cooperating with said display means to concurrently visually display in said display means indications of at least said functions of relative horizontal and vertical displacement of said first and second elongate members at a location remote from said pair of rotatable shafts, said elongate member means, and said reference means.

2. An apparatus as described in claim 1, wherein:

said reference means comprises proximity block means carried by one of said first and second elongate members and having first, vertical face means, and second, horizontal face means;

said remotely operable proximity sensing means includes first, transducer probe means displaced from said first, vertical face means in a direction normal thereto and operable to detect the proximity of said first, transducer probe means relative to said first, vertical face means, and second transducer probe means displaced from said second, horizontal face means in a direction normal thereto and operable to detect the proximity of said second transducer probe means relative to said second, horizontal face means; and generally V-shaped bracket means carried by the other of said elongate members and supporting said first and second transducer probe means in mutually perpendicularly oriented relation.

3. An apparatus as described in claim 1, wherein:

said reference means comprises first, proximity block means carried by one of said first and second elongate members and having first, vertical face means, and second, horizontal face means, and second, proximity block means carried by said one of said first and second elongate members, spaced longitudinally of said shafts from said first proximity block means, and having third, vertical face means, and fourth, horizontal face means;

said remotely operable proximity sensing means includes first, transducer probe means displaced from said first, vertical face means in a direction normal thereto and operable to detect the proximity of said first, transducer probe means relative to said first, vertical face means, and second, transducer probe means displaced from said second, horizontal face means in a direction normal thereto and operable to detect the proximity of said second transducer probe means relative to said second, horizontal face means;

third, transducer probe means displaced from said third, vertical face means in a direction normal thereto and operable to detect the proximity of said third, transducer probe means relative to said third, vertical face means, and fourth, transducer probe means displaced from said fourth, horizontal face means in a direction normal thereto and operable to detect the proximity of said fourth transducer probe means relative to said fourth, horizontal face means;

first generally V-shaped bracket means carried by the other of said elongate members and supporting said first and second transducer probe means in mutually perpendicularly oriented relation; and second generally V-shaped bracket means carried by said other of said elongate members and supporting said third and fourth transducer probe means in mutually perpendicularly oriented relation.

4. Apparatus for aligning a pair of rotatable shafts for operation under thermal equilibrium operating conditions as described in claim 1, wherein:

said remotely operable proxmity sensing means and said reference means are operable to mutually cooperate to detect relative alignment of said elongate member with reference to a periphery of a terminus of one of said shafts, and relative alignment of said second elongate member with reference to a periphery of a terminus of the other of said shafts.

5. Apparatus for aligning a pair of rotatable shafts as described in claim 1 for operation under thermal equilibrium operating conditions, wherein:

said remotely operable proximity sensing means and said reference means are operable to mutually cooperate to detect relative alignment of said plurality of elongate members with respect to an alignment of face portion means of an end of one of said shafts, and relative alignment of said plurality of elongate members with respect to an alignment of a peripheral side means of an end of one of said shafts.

6. Apparatus for aligning a pair of rotatable shafts for operation under thermal equilibrium conditions comprising:

change measuring means operably responsive to thermal changes tending to change the relative alignment between said shafts while said shafts are rotated and said apparatus changes from an at-rest ambient condition to a thermal equilibrium operating condition to measure changes in relative alignment between said shafts;

said change measuring means comprising a plurality of spaced elongate means including a first elongate member, and a second elongate member, said first elongate member having a predetermined orientation with respect to a projected center line of a first of said shafts, and said second elongate member having a predetermined orientation with respect to a projected center line of a second of said shafts, said first and second elongate members being operable to respond to, and undergo relative movement in accordance with, a change in alignment between said projected center lines of said shafts, and sensing means included with said elongate means and operable in response to said relative movement of said first and second elongate members to detect changes in the relative alignment of said shafts while said shafts pass from said at-rest ambient condition to said thermal equilibrium operating condition;

said sensing means comprising remotely operable proximity sensing means carried by said elongate means, reference means carried by said elongate means, spaced from said remotely operable proximity sensing means, and disposed in non-contacting relation therewith, and operating means located remote from said remotely operable proximity sensing means and operable to remotely control the operation thereof;

said reference means and said remotely operable proximity sensing means being so carried by said first and second elongate members as to be relatively displaceable in accordance with relative displacement of said first and second elongate members;

said remotely operable proximity sensing means being operable, while being remotely controlled by said operating means, to sense the proximity of said remotely operable proximity sensing means relative to said reference means while being continuously spaced therefrom; and said remotely operable proximity sensing means being operable to cooperate with display means to display an indication of said proximity of said reference means with respect to said remotely operable proximity sensing means:

said remotely operable proximity sensing means being operable to cooperate with said reference means, while being continuously spaced therefrom, to detect at least a function of relative horizontal displacement of at least said first and second elongate members, and relative vertical displacement of said first and second elongate members;

said remotely operable proximity sensing means being operable to cooperate with said display means to provide a display of said indication of proximity of said reference means with respect to said remotely operable proximity sensing means while said thermal equilibrium condition is being achieved and provide a display indicative of at least said functions of said relative horizontal and vertical displacement of said first and second elongate members occuring as said apparatus changes from said at-rest ambient condition to said thermal equilbrium operating conditions; and said remotely operable proximity sensing means being operable to cooperate with said display means to visually display in said display means indications of at least said functions of relative horizontal and vertical displacement of said first and second elongate members at a location remote from said pair of rotatable shafts, said elongate members, and said reference means.

7. An apparatus as described in claim 6, wherein:

said first elongate member comprises first mounting means fixedly secured relative to said first shaft, and a first plurality of mutually spaced bar means extending generally longitudinally of said first shaft and connected with said first mounting means, said first plurality of bar means defining a polygonal cross section for said first elongate member, oriented transversely of the longitudinal axis of said first shaft; and said second elongate member comprises second mounting means fixedly secured relative to said second shaft, and a second plurality of mutually spaced bar means extending generally longitudinally of said second shaft and connected with said second mounting means, said second plurality of bar means defining a polygonal cross section for said second elongate member oriented transversely of the longitudinal axis of said second shaft.

8. An apparatus as described in claim 6, wherein:

said reference means comprises proximity block means carried by one of said first and second elongate members and having first, vertical face means, and second, horizontal face means;

said remotely operable proximity sensing means includes first, transducer probe means displaced from said first, vertical face means in a direction normal thereto and operable to detect the proximity of said first, transducer probe means relative to said first, vertical face means, and second transducer probe means displaced from said second, horizontal face means in a direction normal thereto and operable to detect the proximity of said second transducer probe means relative to said second, horiziontal face means; and generally V-shaped bracket means carried by the other of said elongate members and supporting said first and second transducer probe means in mutually perpendicuarly oriented relation.

9. An apparatus as described in claim 6, wherein:

said reference means comprises first, proximity block means carried by one of said first and second elongate members and having first vertical face means, and second, horizontal face means, and second, proximity block means carried by said one of said first and second elongate members, spaced longitudinally of said shafts from said first proximity block means, and having third, vertical face means, and fourth, horizontal face means;

said remotely operable proximity sensing means includes first, transducer probe means displaced from said first, vertical face means in a direction normal thereto and operable to detect the proximity of said first, transducer probe means relative to said first, vertical face means, and second, transducer probe means displaced from said second, horizontal face means in a direction normal thereto and operable to detect the proximity of said second transducer probe means relative to said second, horizontal face means;

third, transducer probe means displaced from said third, vertical face means in a direction normal thereto and operable to detect the proximity of said third, transducer probe means relative to said third, vertical face means, and fourth, transducer probe means displaced from said fourth, horizontal face means in a direction normal thereto and operable to detect the proximity of said fourth transducer probe means relative to said fourth, horizontal face means;

first generally V-shaped bracket means carried by the other of said elongate members and supporting said first and second transducer probe means in mutually perpendicularly oriented relation; and second generally V-shaped bracket means carried by said other of said elongate members and supporting said third and fourth transducer probe means in mutually perpendicularly oriented relation.

10. Apparatus for aligning a pair of rotatable shafts for operation under thermal equilibrium operating conditions as described in claim 6, wherein:

said remotely operable proximity sensing means and said reference means are operable to mutually cooperate to detect relative alignment of said first elongate member with reference to a periphery of a terminus of one of said shafts, and relative alignment of said second elongate member with reference to a periphery of a terminus of the other of said shafts.

11. Apparatus for aligning a pair of rotatable shafts as described in claim 6 for operation under thermal equilibrium operating conditions, wherein:

said remotely operable proximity sensing means and said reference means are operable to mutually cooperate to detect relative alignment of said plurality of elongate members with respect to an alignment of face portion means of an end of one of said shafts, and relative alignment of said plurality of elongate members with respect to an alignment of a peripheral side means of an end of one of said shafts.

12. In an apparatus for aligning a pair of rotatable shafts for operation under thermal equilibrium conditions, which apparatus comprises:

change measuring means operably responsive to thermal changes tending to change the relative alignment between said shafts while said shafts are rotated and said apparatus changes from an at-rest ambient condition to a thermal equilibrium operating condition to measure changes in relative alignment between said shafts;

said change measuring means comprising a plurality of spaced elongate means including a first elongate member, and a second elongate member, said first elongate member having a predetermined orientation with respect to a projected center line of a first of said shafts, and said second elongate member having a predetermined orientation with respect to a projected center line of a second of said shafts.

said first and second elongate members being operable to respond to, and undergo relative movement in accordance with, a change in alignment between said projected center lines of said shafts, and reference means carried by said elongate means; the improvement comprising:

sensing means included with said elongate means and operable in response to said relative movement of said first and second elongate members to detect changes in the relative alignment of said shafts while said shafts pass from said at-rest ambient condition to said thermal equilibrium operating condition;

said sensing means comprising remotely operable proximity sensing means operable to be carried by said elongate means in spaced relation with said reference means, and disposed in non-contacting relation therewith, and operating means operable to be located remote from said remotely operable proximity sensing means and remotely control the operation thereof;

said remotely operable proximity sensing means being operable to be so carried by said first and second elongate members as to be relatively displaceable in relation to said reference means in accordance with relative displacement of said first and second elongate members;

said remotely operable proximity sensing means being operable, while being remotely controlled by said operating means, to sense the proximity of said remotely operable proximity sensing means relative to said reference means while being continuously spaced therefrom; and display means operable in response to said remotely operable proximity sensing means to display an indication of said proximity of said reference means with respect to said remotely operable proximity sensing means;

said remotely operable proximity sensing means being operable to cooperate with said reference means, while being continuously spaced therefrom, to detect at least a function of relative horizontal displacement of at least said first and second elongate members, and relative vertical displacement of said first and second elongate members;

said remotely operable proximity sensing means being operable to cooperate with said display means to provide a display of said indication of proximity of said reference means with respect to said remotely operable proximity sensing means while said thermal equilibrium condition is being achieved and provide a display indicative of at least said functions of said relative horizontal and vertical displacement of said first and second elongate members occurring as said apparatus changes from aid at-rest ambient condition to said thermal equilibrium operating condition; and said remotely operable proximity sensing means being operable to cooperate with said display means to visually display in said display means indications of at least said functions of relative horizontal and vertical displacement of said first and second elongate members at a location remote from said pair of rotatable shafts, said elongate members, and said reference means.

13. In a method of aligning a pair of rotatable shafts of operation under thermal equilbrium conditions and utilizing apparatus comprising:
change measuring means operably responsive to thermal changes tending to change the relative alignment between said shafts while said shafts are rotated and said apparatus changes from an at-rest ambient condition to a thermal equilibrium operating condition to measure changes in relative alignment between said shafts;
said change measuring means comprising
a plurality of spaced elongate means including
a first elongate member, and
a second elongate member,
said first elongate member having a predetermined orientation with respect to a projected center line of a first of said shafts, and
said second elongate member having a predetermined orientation with respect to a projected center line of a second of said shafts, and
said first and second elongate members being operable to respond to, and undergo relative movement in accordance with, a change in alignment between said projected center lines of said shafts;
the steps in said method comprising
providing sensing means included with said elongate means and operable in response to said relative movement of said first and second elongate members to detect changes in the relative alignment of said shafts while said shafts pass from said at-rest ambient condition to said thermal equilibrium operating condtion;
providing in said sensing means
remotely operable proximity sensing means carried by said elongate means,
reference means carried by said elongate means, spaced from said remotely operable proximity sensing means, and disposed in non-contacting relation therewith, and
operating means located remote from said remotely operable proximity sensing means and operable to remotely control the operation thereof;
supporting said reference means and said remotely operable proximity sensing means in association with said first and second elongate members so as to be relatively displaceable in accordance with relative displacement of said first and second elongate members;
operating said remotely operable proximity sensing means, while said remotely operable proximity sensing means is being remotely controlled by said operating means, to continuously sense the proximity of said remotely operable proximity sensing means relative to said reference means while being continuously spaced therefrom; in response to proximity sensing cooperation of said remotely operable proximity sensing means with said reference means, and while said remotely operable proximity sensing means is continuously spaced from said reference means, detecting at least a function of
relative horizontal displacement of at least said first and second elongate members, and
relative vertical displacement of said first and second elongate members;
in response to said operating of said remotely operable proximity sensing means, displaying an indication of said proximity of said reference means with respect to said remotely operable proximity sensing means;
continuously displaying said indication of proximity of said reference means with respect to said remotely operable proximity sensing means over a period of operating time while said thermal equilibrium condition is being achieved and providing a display indicative of at least said functions of said relative horizontal and vertical displacement of said first and second elongate members occurring as said apparatus changes from said at-rest ambient condition to said thermal equilibrium operating condition; and
concurrently, visually displaying said indications of at least said functions of relative horizontal and vertical displacement of said first and second elongate members at a location remote from said pair of rotatable shafts, said elongate members, and said reference means.

14. In a method of aligning a pair of rotatable shafts for operation under thermal equilibrium conditions and utilizing apparatus comprising;
change measuring means operably responsive to thermal changes tending to change the relative alignment between said shafts while said shafts are rotated and said apparatus changes from an at-rest ambient condition to a thermal equilibrium operating condition to measure changes in relative alignment between said shafts;
said change measuring means comprising
a plurality of spaced elongate means including
a first elongate member, and
a second elongate member,
said first elongate member having a predetermined orientation with respect to a projected center line of a first of said shafts, and
said second elongate member having a predetermined orientation with respect to a projected center line of a second of said shafts, and
said first and second elongate members being operable to respond to, and undergo relative movement in accordance with, a change in alignment between said projected center lines of said shafts;
the steps in said method comprising
providing sensing means included with said elongate means and operable in response to said relative movement of said first and second elongate members to detect changes in the relative alignment of said shafts while said shafts pass from said at-rest ambient condition to said thermal equilibrium operating condition;
providing in said sensing means
remotely operable proximity sensing means carried by said elongate means,
reference means carried by said elongate means, spaced from aid remotely operable proximity sensing means, and disposed in non-contacting relation therewith, and
operating means located remote from said remotely operable proximity sensing means and operable to remotely control the operation thereof;

supporting said reference means and said remotely operable proximity sensing means in association with said first and second elongate members so as to be relatively displaceable in accordance with relative displacement of said first and second elongate members;

operating said remotely operable proximity sensing means, while said remotely operable proximity sensing means is being remotely controlled by said operating means, to sense the proximity of said remotely operable proximity sensing means relative to said reference means while being continuously spaced therefrom; in response to proximity sensing cooperation of said remotely operable proximity sensing means with said reference means, said while said remotely operable proximity sensing means is continuously spaced from said reference means, detecting at least a function of relative horizontal displacement of at least said first and second elongate members, and relative vertical displacement of said first and second elongate members;

in response to said operating of said remotely operable proximity sensing means, displaying an indication of said proximity of said reference means with respect to said remotely operable proximity sensing means;

displaying said indication of proximity of said reference means with respect to said remotely operable proximity sensing means while said thermal equilibrium condition is being achieved and providing a display indicative of at least said functions of said relative horizontal and vertical displacement of said first and second elongate members occurring as said apparatus changes from said at-rest ambient condition to said thermal equilibrium operating condition; and visually displaying said indications of at least said functions of relative horizontal and vertical displacement of said first and second elongate members at a location remote from said pair of rotatable shafts, said elongate members, and said reference means.

15. A method of aligning a pair of rotatable shafts for operation under thermal equilibrium operating conditions, as described in claim 14, wherein:

said remotely operable proximity sensing means and said reference means cooperate to detect relative alignment of said first elongate member with reference to a periphery of a terminus of one of said shafts, and relative alignment of said second elongate member with reference to a periphery of a terminus of the other of said shafts.

16. A method of aligning a pair of rotatable shafts for operation under thermal equilibrium operating conditions, as described in claim 14, wherein:

said remotely operable proximity sensing means and said reference means cooperate to detect relative alignment of said plurality of elongate members with respect to an alignment of face portion means of an end of one of said shafts, and relative alignment of said plurality of elongate members with respect to an alignment of a peripheral side means of an end of one of said shafts.

17. In an apparatus for aligning a pair of rotatable shafts for operation under thermal equilibrium conditions, which apparatus comprises:

change measuring means operably responsive to thermal changes tending to change the relative alignment between said shafts while said shafts are rotated and said apparatus changes from an at-rest ambient condition to a thermal equilibrium operating condition to measure changes in relative alignment between said shafts;

the improvement wherein:

said change measuring means includes a plurality of spaced elongate means including a first elongate member, and a second elongate member, said first elongate member being operable to have a predetermined orientation with respect to a projected center line of a first of said shafts, and said second elongate member being operable to have a predetermined orientation with respect to a projected center line of a second of said shafts, said first and second elongate members being operable to respond to, and undergo relative movement in accordance with, a change in alignment between said projected center lines of said shafts, and said elongate means being operable to cooperate with sensing means comprising remotely operable proximity sensing means carried by said elongate means, reference means carried by said elongate means, spaced from said remotely operable proximity sensing means, and disposed in non-contacting relation therewith, and operating means located remote from said remotely operable proximity sensing means and operable to remotely control the operation thereof, with said sensing means being operable in response to said relative movement of said first and second elongate members to detect changes in the relative alignment of said shafts while said shafts pass from said at-rest ambient condition to said thermal equilibrium operating condition;

said first and second elongate members being operable to carry said reference means and said remotely operable proximity sensing means, so that said reference means and said remotely operable proximity sensing means are relatively displaceable in accordance with relative displacement of said first and second elongate members;

said first elongate member comprises first mounting means operable to be fixedly secured relative to said first shaft, and a first plurality of mutually spaced bar means operable to extend generally longitudinally of said first shaft and be connected with said first mounting means, said first plurality of bar means, defining a polygonal cross section for said first elongate member, operable to be oriented transversely of the longitudinal axis of said irst shaft; and said second elongate member comprises second mounting means operable to be fixedly secured relative to said second shaft, and a second plurality of mutually spaced bar means operable to extend generally longitudinally of said second shaft and be connected with said second mounting means, said second plurality of bar means defining a polygonal cross section for said second elongate member operable to be oriented transversely of the longitudinal axis of said second shaft;

said remotely operable proximity sensing means being operable, while being remotely controlled by said operating means, to sense the proximity of said remotely operable proximity sensing means relative to said reference means while being continuously spaced therefrom; and said remotely operable proximity sensing means being operable to cooperate with display means to display an indication of said proximity of said reference means with respect to said remotely operable proximity sensing means;

said remotely operable proximity sensing means being operable to cooperate with said reference means, while being continuously spaced therefrom, to detect at least a function of relative horizontal displacement of at least said first and second elongate members, and relative vertical displacement of said first and second elongate members;

said remotely operable proximity sensing means being operable to cooperate with said display means to provide a display of said indication of proximity of said reference means with respect to said remotely operable proximity sensing means while said thermal equilibrium condition is being achieved and provide a display indicative of at least said functions of said relative horizontal and vertical displacement of said first and second elongate members occurring as said apparatus changes from said at-rest ambient condition to said thermal equilibrium operating condition; and said remotely operable proximity sensing means being operable to cooperate with said display means to visually display in said display means indications of at least said functions of relative horizontal and vertical displacement of said first and second elongate members at a location remote from said pair of rotatable shafts, said elongate members, and said reference means.

* * * * *